United States Patent
Nelson (10) Patent No.: US 10,311,650 B2
(45) Date of Patent: Jun. 4, 2019

(54) APPLICATION, DEVICE AND SYSTEM FOR TOLL COLLECTION

(71) Applicant: Anthony Nelson, Dorr, MI (US)

(72) Inventor: Anthony Nelson, Dorr, MI (US)

(*) Notice: Subject to any disclaimer, the term of this patent is extended or adjusted under 35 U.S.C. 154(b) by 170 days.

(21) Appl. No.: 15/254,110

(22) Filed: Sep. 1, 2016

(65) Prior Publication Data

US 2018/0061143 A1    Mar. 1, 2018

(51) Int. Cl.
| | |
|---|---|
| *G07B 15/06* | (2011.01) |
| *G07B 15/00* | (2011.01) |
| *G06Q 20/10* | (2012.01) |
| *H04W 4/02* | (2018.01) |
| *G06F 16/29* | (2019.01) |
| *G06F 16/903* | (2019.01) |
| *G06F 16/583* | (2019.01) |
| *G06Q 20/32* | (2012.01) |

(52) U.S. Cl.
CPC ............ *G07B 15/00* (2013.01); *G06F 16/29* (2019.01); *G06F 16/5854* (2019.01); *G06F 16/903* (2019.01); *G06Q 20/10* (2013.01); *G06Q 20/3224* (2013.01); *G06Q 20/3278* (2013.01); *G07B 15/063* (2013.01); *H04W 4/02* (2013.01); *G06Q 2240/00* (2013.01)

(58) Field of Classification Search
CPC .. G06Q 20/145; G06Q 50/30; G06Q 20/3224; G07B 15/063; G07B 15/00; G06F 17/30241; G06F 17/30259
See application file for complete search history.

(56) References Cited

U.S. PATENT DOCUMENTS

| | | | |
|---|---|---|---|
| 4,303,904 A | 12/1981 | Chasek | |
| 6,658,392 B2 | 12/2003 | Yoshida | |
| 7,254,382 B2 | 7/2007 | Hasan et al. | |
| 8,587,454 B1 | 11/2013 | Dearworth | |
| 2002/0067291 A1 | 6/2002 | Ikeda | |
| 2002/0130175 A1 | 9/2002 | Nakajima | |
| 2002/0188575 A1 | 12/2002 | Freeny, Jr. | |
| 2002/0198767 A1 | 12/2002 | Kim | |
| 2004/0233046 A1* | 11/2004 | Gotfried | B60R 25/04 340/426.1 |
| 2005/0168351 A1 | 8/2005 | Saze et al. | |
| 2005/0238149 A1 | 10/2005 | De Leon | |

(Continued)

FOREIGN PATENT DOCUMENTS

JP      2001319253    * 11/2001

OTHER PUBLICATIONS

FastToll Manual, published Mar. 26, 2016 http://www.pragmistic.com/fasttoll/ios-app-manual (Year: 2016).*

*Primary Examiner* — Brian M Epstein
*Assistant Examiner* — Lisa Ma
(74) *Attorney, Agent, or Firm* — King & Partners, PLC (57) ABSTRACT

Applications, devices and systems for toll collection are disclosed herein. An example system includes a mobile computing device that generates location based information of the mobile computing device, queries a database of toll booths defined by toll booth location, determines that the location based information of the mobile computing device matches at least one of the toll booth locations, and transmits to a gateway server location based information and identifying information that identifies a vehicle. The toll is processed using the received information.

1 Claim, 5 Drawing Sheets

(56) References Cited

U.S. PATENT DOCUMENTS

| | | |
|---|---|---|
| 2006/0258367 A1 | 11/2006 | Chiang |
| 2006/0278705 A1* | 12/2006 | Hedley ................ G07B 15/063 |
| | | 235/384 |
| 2007/0037554 A1 | 2/2007 | Freeny, Jr. |
| 2007/0285256 A1 | 12/2007 | Batra |
| 2010/0106567 A1 | 4/2010 | McNew et al. |
| 2013/0297387 A1* | 11/2013 | Michael ................ G08G 1/0112 |
| | | 705/13 |
| 2014/0025444 A1* | 1/2014 | Willis ................ G06Q 20/3272 |
| | | 705/13 |
| 2014/0032282 A1* | 1/2014 | Fu .......................... G07B 15/06 |
| | | 705/13 |
| 2015/0088617 A1* | 3/2015 | Geist ...................... G06Q 20/26 |
| | | 705/13 |
| 2016/0055466 A1* | 2/2016 | Du ........................ G06Q 20/145 |
| | | 705/13 |
| 2016/0180604 A1* | 6/2016 | Wilson ................ G07B 15/063 |
| | | 705/4 |

* cited by examiner

APPLICATION, DEVICE AND SYSTEM FOR TOLL COLLECTION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The present disclosure relates in general to toll process management, and, more particularly, to applications, devices, and systems for toll collection. The present disclosure further relates to methods for utilizing the applications and devices disclosed herein for the processing of tolls. Among other things, the applications, devices, and systems for toll collection disclosed herein facilitate efficient processing of tolls via a plurality of novel protocols.

2. Background Art

Toll collection systems have been known in the art for years, and are the subject of numerous patents, including, for example: U.S. Pat. No. 7,254,382 entitled "Toll Payment Service Via Wireless Communication Networks," U.S. Pat. No. 6,658,392 entitled "Automatic Toll Collection System for Automotive Vehicle," U.S. Pat. No. 4,303,904 entitled "Universally Applicable, In-Motion and Automatic Toll Paying System Using Microwaves," United States Patent Application Publication Number 2007/0285256 entitled "RFID Systems and Methods," United States Patent Application Publication Number 2007/0037554 entitled "Communication and Proximity Authorization Systems," United States Patent Application Publication Number 2006/0258367 entitled "Using Cell Phones and Wireless Cellular Systems with Location Capability for Toll Paying and Collection," United States Patent Application Publication Number 2005/0238149 entitled "Cellular Phone-Based Automatic Payment System," United States Patent Application Publication Number 2005/0168351 entitled "Device and System for Toll Payment," United States Patent Application Publication Number 2002/0198767 entitled "Fee Collecting System and Method for Motor Vehicle," United States Patent Application Publication Number 2002/0188575 entitled "Advanced Wireless Phone System," United States Patent Application Publication Number 2002/0130175 entitled "Electronic Payment System, Payment Apparatus and Terminal Thereof," and United States Patent Application Publication Number 2002/0067291 entitled "System for Toll Payment and Transportation Management"—all of which are hereby incorporated herein by reference in their entirety including the references cited therein.

U.S. Pat. No. 7,254,382 appears to disclose a method of processing toll payments for a motorist having a wireless communications device and a billing account, via a wireless communications network. The method includes sensing that the motorist is within range of a base station for a toll plaza having a given toll that is to be paid by the motorist; determining via a mobile switching center whether the motorist has activated a wireless toll payment service associated with the communication device; evaluating via the mobile switching center whether the subscriber has preselected a combined billing option for the account, where it has been determined that the service has been activated by the subscriber; sending a charge transaction from the mobile switching center to a toll payment system, where the motorist has not selected the combined billing option, the charge transaction indicating that the toll has not been paid by the motorist; and generating a billing record for the motorist at the mobile switching center and sending a non-charge transaction from the mobile switching center to a toll payment system, where the motorist has selected the combined billing option, the non-charge transaction indicating that the toll has been billed to the motorist by his/her wireless service provider.

U.S. Pat. No. 6,658,392 appears to disclose an automatic toll collection system for automotive vehicles moving along a roadway which includes a toll collecting facility and an inspecting facility. The toll collecting facility is installed in a toll booth on the roadway to collect the tolls from an in-vehicle unit through radio communication. The inspecting facility is provided outside the roadway and troubleshoots the in-vehicle unit when an abnormal condition in which it is impossible to collect the tolls from the in-vehicle unit correctly is encountered.

U.S. Pat. No. 4,303,904 appears to disclose a single, universally applicable system and apparatus that can eliminate most toll stops and simplify funds transfers. The system starts with a lump sum paid in advance to a permanently assigned collection agency's representative. This sum is inserted, electronically, into the memory of a microwave transponder-data-processor, normally kept in the vehicle. As the vehicle passes suitably equipped toll collection facilities, a toll transponder receives billing information from the vehicle transponder, calculates the toll, transmits it back to the vehicle transponder where the toll is electronically subtracted from a stored balance. If the resulting balance is not negative, a pass signal is flashed. The information stored in the vehicle transponder's permanent memory includes a vehicle-owner code, a collection agent's code and a vehicle-class code. The availability of this information and the toll, plus the procedure for increasing the pre-paid balance makes possible a computerized and automated double entry bookkeeping and funds transfer system. Security is achieved by crypto insertion codes. The stored current balance in the vehicle transponder is always indicated by a liquid crystal display.

United States Patent Application Publication Number 2007/0285256 appears to disclose a Radio Frequency Identification (RFID) tag for use with a vehicle according to one embodiment that includes a housing adapted for permanent or detachable coupling to the vehicle, control circuitry coupled to the housing, and a battery for providing power to the control circuitry. A secondary power source is also present for recharging the battery. A memory stores information relating to at least one of the vehicle and an owner of the vehicle. The capability of recharging the battery extends the active (self-powered) life of the tag. Systems for tracking ownership of objects, servicing of vehicles, and other applications, as well as methods are also presented.

United States Patent Application Publication Number 2007/0037554 appears to disclose a proximity service unit for providing at least one predetermined service for use with multiple types of wireless devices. The proximity service unit includes a multiple channel wireless transceiver, a proximity unit validation assembly, and a legacy activation unit. The multiple channel wireless transceiver receives at least two signal types, such as infrared region signals, 900 MHz region signals, 1.8 GHz region signals, and 2.4 GHz region signals. The multiple channel wireless transceiver receives a request authorization code from each of a plurality of respective wireless devices such that the plurality of wireless devices communicate simultaneously with the multiple channel wireless transceiver without air time. The proximity unit validation assembly communicates with the multiple channel wireless transceiver and receives and validates the plurality of request authorization codes received by the multiple channel wireless transceiver. The legacy activation unit receives a service authorization code and provides at least one predetermined service for each wireless device providing the request authorization code resulting in a service authorization code.

United States Patent Application Publication Number 2006/0258367 appears to disclose a method for toll collection via a wireless network that tracks a current position of a mobile station within a vehicle, and collecting a toll based on the current position of the mobile station.

United States Patent Application Publication Number 2005/0238149 appears to disclose a wireless payment system that allows high speed operation without user intervention with the convenience that cellular phones provide. The system uses a wireless stored value module attached to an ordinary cellular phone or embedded in the cellphone's Subscriber Identity Module (SIM) card. A reader is installed in points of transaction that communicates with the module and deducts the balance stored in the module for effecting the payment. The transaction is sent by the reader to a central database to update a copy of the module's balance and perform settlement functions at the end of the day. After every transaction, a SMS or text confirmation is received by the cellphone user which indicates the amount paid and remaining balance in the module. Re-loading of values in the module can be accomplished solely by sending text messages using a cellular phone from anywhere, any time.

United States Patent Application Publication Number 2005/0168351 appears to disclose a navigation device that stores road data that includes positions of toll roads where payback of a part of a toll is provided based on a used distance of each of the toll roads. The navigation device computes a traveled distance of the relevant toll road to thereby compute the used distance of the toll road based on the computed traveled distance. Thus, the used distance of a toll road can be accurately computed, even when a vehicle travels a loop line within the toll road by multiple circles. Information that relates to the payback and includes the used distance of the toll road is then transmitted to a center to thereby receive a partial payback of the toll.

United States Patent Application Publication Number 2002/0198767 appears to disclose a fee collecting system for motor vehicles. The fee collecting system includes a plurality of collecting systems that transmit payment request signals to a motor vehicle and receive response signals to payment requests from the motor vehicle, a motor vehicle control device mounted in the motor vehicle that transmits a telephone number and the information of the motor vehicle when the payment request signal is detected, a central system that receives and records information from the collecting systems and calculates charges when the motor vehicle leaves, and a payment system that settles the payment of the charges and notifies it to the central system. The present invention can automatically detect the entrance and departure of a motor vehicle and make charges through a mobile phone number mounted in the vehicle, and notify the driver of a process result of the charges of the motor vehicle through a mobile phone number mounted in the vehicle. Additionally, the present invention can save resources because a secondhand mobile phone is used as a car phone by being connected with the motor vehicle control device.

United States Patent Application Publication Number 2002/0188575 appears to disclose a wireless phone/pager system that is modified to allow an owner to have proximity services such as toll tag access, ATM dispensing, gas pump dispensing, store credit card checkout, television remote control, garage door access, and more services using their wireless phone/pager. The modification is accomplished in such a way that the existing wireless phone/pager/palm computer systems and the proximity device processing units require very little modification but produce a truly Advanced Wireless Phone/pager/palm computer System (AWPS). The AWPS can be appended in a seamless manner to the existing wireless communication and proximity service provider systems in current use. The new system virtually eliminates the need to carry multiple credit cards and access devices such as toll tags. Another feature of the invention is the built-in finger print detector unit which automatically provides unique owner codes which can be used to either replace or supplement the PIN codes usually required with the proximity service providers. The system may also combine multiple proximity billing services with the phone/pager service provider, i.e., another convenience that would be greatly appreciated by the consumer.

United States Patent Application Publication Number 2002/0130175 appears to disclose an electronic payment system for making electronic money payments for transactions. A payment terminal stores a balance of electronic money for payment by electronic money. A demanding terminal communicates with the payment terminal to demand the payment and a payment apparatus communicates with the demanding terminal and stores a balance of electronic money to correspond to an identification number of the payment terminal for allowing settlement on the dealing. The demanding terminal receives from the payment terminal the balance stored in the payment terminal and transmits the balance to the payment apparatus. The payment apparatus detects an improper use by checking the balance stored in the payment terminal, which was received from the demanding terminal, with the balance stored in the payment apparatus. The system of the present invention provides secure and convenient electronic money payment for a user's transaction.

United States Patent Application Publication Number 2002/0067291 appears to disclose a method to pay a toll without stopping a car and without providing a special lane for electronic payment, thereby reducing a traffic jam. The toll payment system comprises a portable telephone on a car, a base station connected with the portable telephone, a server connected with the base station. The server comprises a first memory for storing a location of the base station, a second memory for storing a unit price for each section along the highway and data identifying a contractor or contracted car, a driving route identification unit for identifying a driving route on the basis of the location stored in the first memory and a base station connected under a certain manner, a toll calculation, and a charging unit.

While the above-identified patents and publications do appear to disclose payment systems, their configurations remain non-desirous and/or problematic inasmuch as, among other things, none of the above-identified systems appear to be configured to facilitate efficient payment of tolls via a plurality of novel protocols disclosed herein.

It is therefore an object of the present invention to provide applications, devices and systems for efficient toll collection and/or payment via a plurality of novel protocols.

These and other objects of the present invention will become apparent in light of the present specification, claims, and drawings.

SUMMARY OF THE INVENTION

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system, including: a mobile computing device that: generates location based information of the mobile computing device; queries a database of toll booths defined by toll booth locations; determining that the location based information of the mobile computing device matches at least one of the toll booth locations; and transmitting to a gateway server location based information and identifying information that identifies a vehicle; and where the gateway server: receives the location based information and the identifying information; and requests payment of a toll by charging an account associated with the identifying information, the toll being based on the location based information. Other embodiments of this aspect include corresponding computer systems, apparatus, and computer programs recorded on one or more computer storage devices, each configured to perform the actions of the methods.

Implementations may include one or more of the following features. In one or more embodiments the location based information is generated by a map application that executes on the mobile communications. In one or more embodiments the account is maintained in a database accessible to the gateway server. In one or more embodiments identifying information for the mobile computing device and the identifying information for the vehicle are stored in the account. In one or more embodiments the account further includes stored payment information for an account user. In one or more embodiments a sensor module is associated with the toll booth, the sensor module being configured to transmit a token including identifying information for the toll booth to the mobile computing device. In one or more embodiments the gateway server receives the token along with the location based information and the identifying information from the mobile computing device. In one or more embodiments the sensor module is further configured to capture an image of a license plate of the vehicle, further where the gateway server matches the license plate of the vehicle with the identifying information in the payment request.

One general aspect includes a method, comprising: generating location based information of a mobile computing device; querying a database of toll booths defined by toll booth locations; determining that the location based information of the mobile computing device matches at least one of the toll booth locations; transmitting to a gateway server the location based information and identifying information that identifies a vehicle; and receiving confirmation that a toll has been paid from an account associated with the identifying information, where payment for the toll is based on the location based information and the identifying information. Other embodiments of this aspect include corresponding computer systems, apparatus, and computer programs recorded on one or more computer storage devices, each configured to perform the actions of the methods.

Implementations may include one or more of the following features. In one or more embodiments methods comprise bringing the mobile computing device into proximity with the at least one of the toll booth locations. In one or more embodiments methods include communicatively coupling the mobile computing device with a gateway server over a long-range or short-range wireless link that generates the confirmation. In one or more embodiments methods include identifying information for the mobile computing device and the identifying information for the vehicle being stored in the account. The method according where the account further includes stored payment information for an account user. In one or more embodiments methods include transmitting the location based information and identifying information that identifies the vehicle occurs when the vehicle is passing through the at least one of the toll booth locations. In one or more embodiments methods include where an amount of the toll is selectively adjusted based on a time of day or day of a week. The method according further including receiving a token from a wireless module associated with the toll booth, the token including identifying information for the toll booth. In one or more embodiments methods include capturing an image of a license plate of the vehicle. In one or more embodiments methods include matching the license plate of the vehicle with the identifying information in the payment request. Implementations of the described techniques may include hardware, a method or process, or computer software on a computer-accessible medium.

One general aspect includes a system, consisting of: a mobile computing device that: generates location based information of the mobile computing device; queries a database of toll booths defined by toll booth locations; determining that the location based information of the mobile computing device matches at least one of the toll booth locations; and transmitting to a gateway server location based information and identifying information that identifies a vehicle; and where the gateway server: receives the location based information and the identifying information; and requests payment of a toll by charging an account associated with the identifying information, the toll being based on the location based information. Other embodiments of this aspect include corresponding computer systems, apparatus, and computer programs recorded on one or more computer storage devices, each configured to perform the actions of the methods.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted. It will be further understood that the invention is not necessarily limited to the particular embodiments illustrated herein.

The invention will now be described with reference to the drawings wherein.

DETAILED DESCRIPTION OF THE INVENTION

While this invention is susceptible of embodiment in many different forms, there is shown in the drawings and described herein in detail several specific embodiments with the understanding that the present disclosure is to be considered as an exemplification of the principles of the invention and is not intended to limit the invention to the embodiments illustrated.

It will be understood that like or analogous elements and/or components, referred to herein, are identified throughout the drawings by like reference characters. In addition, it will be understood that the drawings are merely schematic representations of one or more embodiments of the invention, and some of the components may have been distorted from their actual scale for purposes of pictorial clarity.

Figure 1:
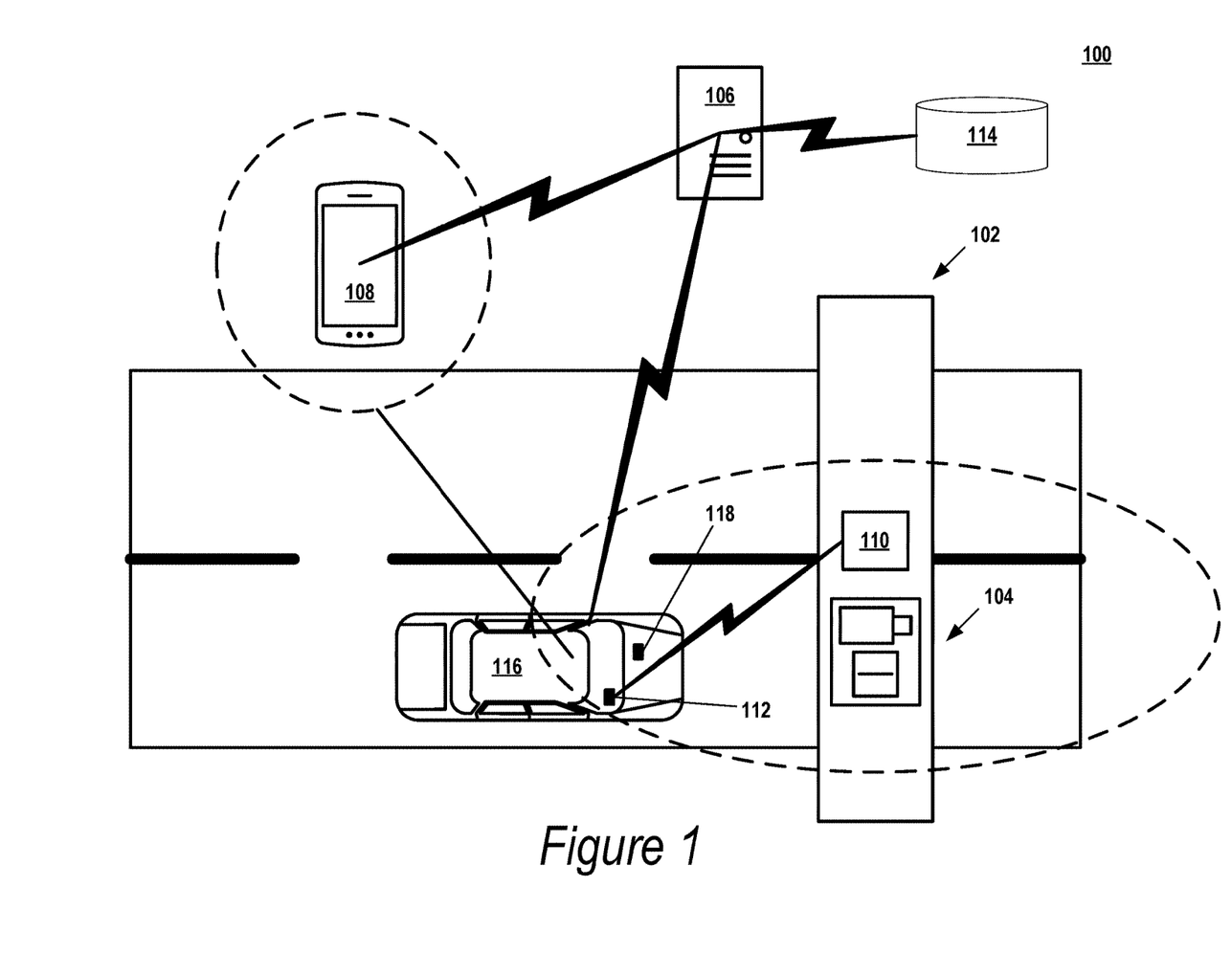
FIG. 1 is a schematic diagram of an example system that is utilized to practice aspects of the present disclosure.

Referring now to FIG. 1, an example system 100 of the present disclosure comprises a toll booth 102, a sensor module 104, a gateway server 106, and a mobile computing device 108 (such as a Smartphone, tablet, or laptop). As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality.

In some embodiments, the toll booth 102 is a toll collecting plaza or kiosk that is located proximate to a road, such as a highway. The toll booth 102 can comprise a manual toll collection means such as a change collecting device or a human toll collector. The toll booth 102 can also comprise a wireless toll collection means such as the sensor module 104, which comprise a radio frequency identification (RIFD) reader 110 that reads an RFID tag 112 in a vehicle. A user account is associated with the RFID tag and the user of the vehicle is charged based on events when the RFID tag 112 is brought into proximity with the RFID reader 110.

In some embodiments, rather than relying on manual toll payments and/or use of an RFID system, a toll is processed using the mobile computing device 108. To be sure, RFID systems used in toll processing are location and system dependent such that a particular RFID system in one state is not capable of sensing an RFID tag that was enabled for use on another RFID system in a different state. In these instances the user is required to manually pay the toll. If the user does not have change (a common occurrence when the user relies on their RFID tag for toll payment) the user cannot pay the toll and may end up illegally driving through the toll booth, which can result in a fine. The present disclosure provides a method and system for universal toll payment that does not rely on RFID tags or manual toll payments.

In some embodiments, these functionalities are provided by the mobile computing device 108. In one embodiment the mobile computing device 108 comprises an application that resides on the mobile computing device 108.

Examples of applications can include map applications, or navigation systems 118 that execute within the vehicle 116, or a standalone application that cooperates with a map application. When the application includes a navigation application in a vehicle, the vehicle is the mobile computing device 108.

When executed, the application can cause the mobile computing device 108 to determine location based information for the mobile computing device 108. This determination of location based information can occur on a periodic (e.g., scheduled) or continual basis. In one embodiment the location based information can be obtained from a GPS module of the mobile computing device 108 or by use of other methods for obtaining location based information that would be known to one of ordinary skill in the art with the present disclosure before them. Regardless of the method used the mobile computing device 108 generates location based information of the mobile computing device 108.

The application can concurrently query a database 114 of toll booth locations. Each of the toll booth locations comprises coordinates that define a geographical location of a toll booth. In some embodiments, the mobile computing device 108 compares the current location based information for the mobile computing device 108 to determine if the location based information of the mobile computing device 108 matches at least one of the toll booth locations in the database 114. In one embodiment, the application implements a geographical threshold that excludes toll processing if the vehicle and/or mobile computing device 108 are not within a specific distance of toll booth coordinates in the database 114. For example, if the mobile computing device 108 is not within 100 feet of a toll booth location a toll is not processed.

In some embodiments, when the mobile computing device 108 determines that its location matches a location of toll booth in the database, the mobile computing device 108 transmits to the gateway server 106 the location based information and identifying information that identifies a vehicle such as a VIN number or license plate number. Stated otherwise, the mobile computing device 108 requests payment of a toll by charging an account associated with the identifying information. Again, the toll is based on the location based information of the vehicle and toll booth.

In some embodiments, prior to utilizing the toll processing methods and systems a user establishes a user account that includes VIN numbers for one or more vehicles, payment information, and identifying information for the user, such as name, address, and so forth.

Once the gateway server 106 receives the location based information and identifying information of the vehicle, the gateway server 106 executes a lookup or query of the database 114 using the location based information to determine a toll booth by which the vehicle is driving. The toll booth identifies a toll road and/or toll amount that that is to be charged to the account of the user. The gateway server 106 uses the identifying information of the vehicle to lookup a user account.

When the gateway server 106 determines the appropriate toll booth relative to the request and the proper account to be charged, the gateway server 106 charges the payment information (e.g., stored payment information) of the user account.

In another embodiment, rather than using location based information, the mobile computing device 108 determines from the database 114 a toll booth identifier that uniquely identifies the toll booth that the vehicle is passing by. The mobile computing device 108 transmits the toll booth identifier to the gateway server 106 along with the identifying information for the vehicle and/or a user account identifier.

In one embodiment, the sensor module 104 is configured to broadcast the toll booth identifier as a token. This token is received by the mobile computing device 108 when the mobile computing device 108 passes within proximity to the sensor module 104. Rather than requiring the mobile computing device 108 to transmit identifying information for vehicle and/or mobile computing device 108, the token/toll booth identifier can be substituted.

In another advantage of the present disclosure the mobile computing device 108 can request toll payment independent of the vehicle, in contrasts with systems that use RFID tags mounted on the vehicle. In these embodiments, the mobile computing device 108 transmits identifying information such as a user account, rather than a VIN number. In sum, the present disclosure allows for the processing of a toll payment without linking information indicative of the vehicle to the payment of the toll.

Regardless of the method used to request toll payment, the gateway server 106 is configured to transmit to the user a receipt that verifies a successful or unsuccessful toll payment. The receipt can be transmitted by the gateway server 106 to the mobile computing device 108 using, for example, SMS or MMS messaging, or via electronic mail. In other embodiments the gateway server 106 stores the payment verification in the user account.

In some embodiments, the gateway server 106 and mobile computing device 108 are communicatively coupled with one another over any public or private network. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 120 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

According to some embodiments, such as embodiments that utilize identifying information for a vehicle comprising a license plate, the sensor module 104 comprises a camera or plurality of cameras that are configured to capture an image of a license plate of the vehicle. The gateway server 106 matches the license plate of the vehicle with the identifying information in the payment request. The license plate information can be pre-stored in the user account. The gateway server 106 can match the license plate information in the payment request to license plate information stored in the database 114.

It will be understood that while some embodiments described herein contemplate the storage of various types of identifying information, as well as payment information (e.g., a credit card or prepayment balance) that are stored in the database 114, these types of information can likewise be stored locally on the mobile computing device 108 rather than being stored in a remote database. The mobile computing device 108 transmits the locally stored information to the gateway server 106 when a payment is requested.

Figure 2:
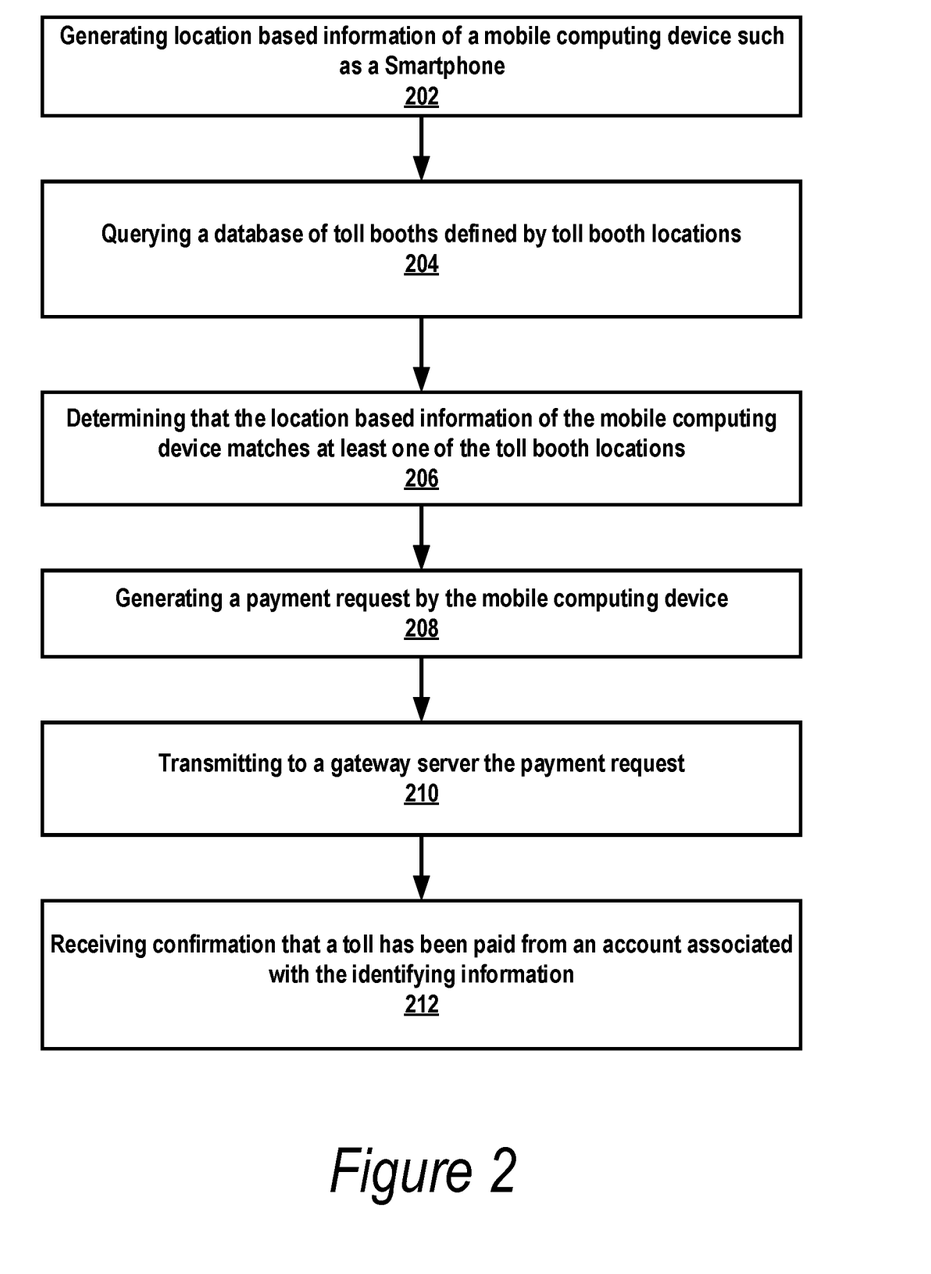
FIG. 2 is a flowchart of an example method of the present disclosure for processing a toll.

Referring now to FIG. 2, a method for processing a toll payment is illustrated. The method includes a step 202 of generating location based information of a mobile computing device such as a Smartphone. For example, GPS information is obtained by the mobile computing device from a GPS module within the mobile computing device.

Next, the method comprises a step 204 of querying a database of toll booths defined by toll booth locations. This can comprise a background process executing on the mobile computing device during use of a map application that implements the toll payment features described herein.

In some embodiments, the application executing on the mobile computing device will generate a toll payment graphical user interface (GUI) that allows the user to select to pay a toll. This GUI is generated and presented to the user via the mobile computing device when the mobile computing device is in proximity to the toll booth.

In one embodiment, the method includes a step 206 of the mobile computing device determining that the location based information of the mobile computing device matches at least one of the toll booth locations.

If a match is determined between the location based information of the mobile computing device and at least one of the toll booth locations, the method includes a step 208 of generating a payment request by the mobile computing device. The payment request can comprise any of: identifying information for the mobile computing device and/or a vehicle, location based information of the mobile computing device, a token that is indicative of the toll booth, or any combinations and permutations thereof.

Once the payment request is generated, the method includes a step 210 of transmitting to a gateway server the payment request. Again, the payment request can comprise, for example, location based information for the mobile computing device or the toll booth, and identifying information that identifies a vehicle and/or the mobile computing device.

After the gateway server requests payment processing, the method includes a step 212 of receiving confirmation that a toll has been paid from an account associated with the identifying information. It will be understood that payment for the toll is based on the location based information of the mobile computing device or vehicle and the identifying information, in one embodiment. Again, other embodiments can include using user account information and a token that identifies the toll booth.

Due to the flexibility and adaptability of the systems and methods of the present disclosure, it is envisioned that the systems disclosed herein can utilize toll amounts that vary according to time, day of the week, current or historic traffic volume, and so forth.

Figure 3:
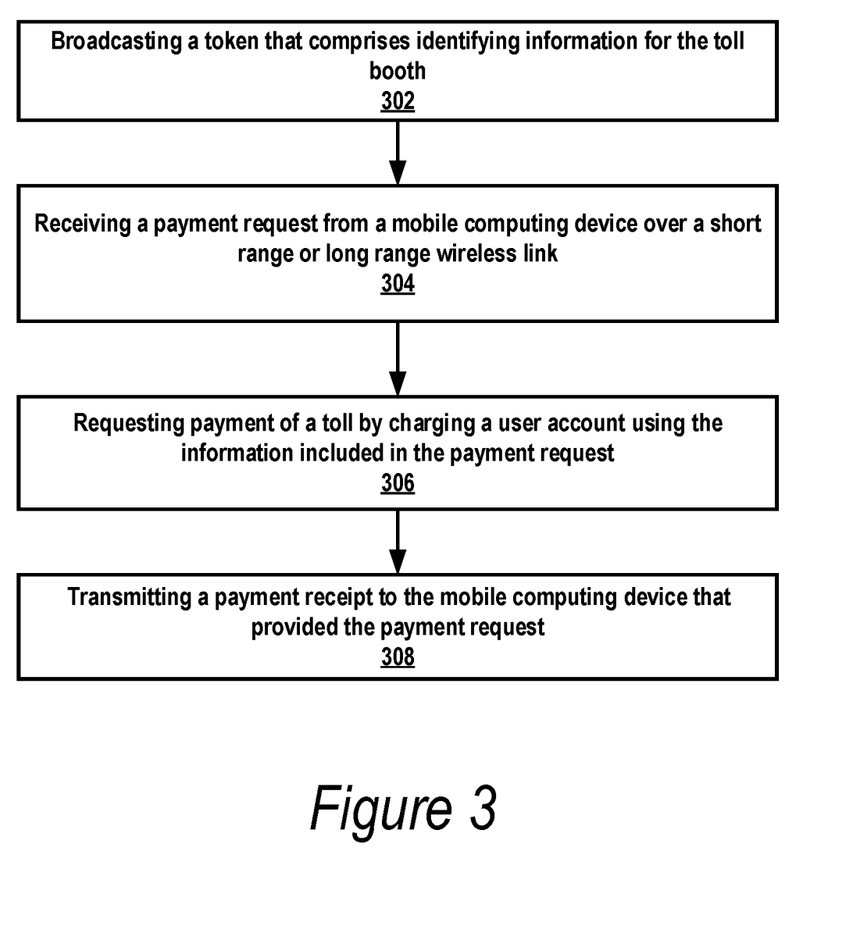
FIG. 3 is a flowchart of another example method of the present disclosure for processing a toll.

Referring now to FIG. 3, which comprises a method executed by the gateway server and/or sensor modules described above. The method includes a step 302 of the sensor module broadcasting a token that comprises identifying information for the toll booth.

Next, the method includes a step 304 of receiving a payment request from a mobile computing device over a short range or long range wireless link. Again, the payment request can include various permutations of any of location based information for the mobile computing device, identifying information that identifies the mobile device, a vehicle, or a user account. In another embodiment the token that was broadcast by the sensor module is provided in the payment request.

In some embodiments, the method includes a step 306 of requesting payment of a toll by charging a user account using the information included in the payment request.

In one embodiment, the method comprises a step 308 of transmitting a payment receipt to the mobile computing device that provided the payment request.

Figure 4:
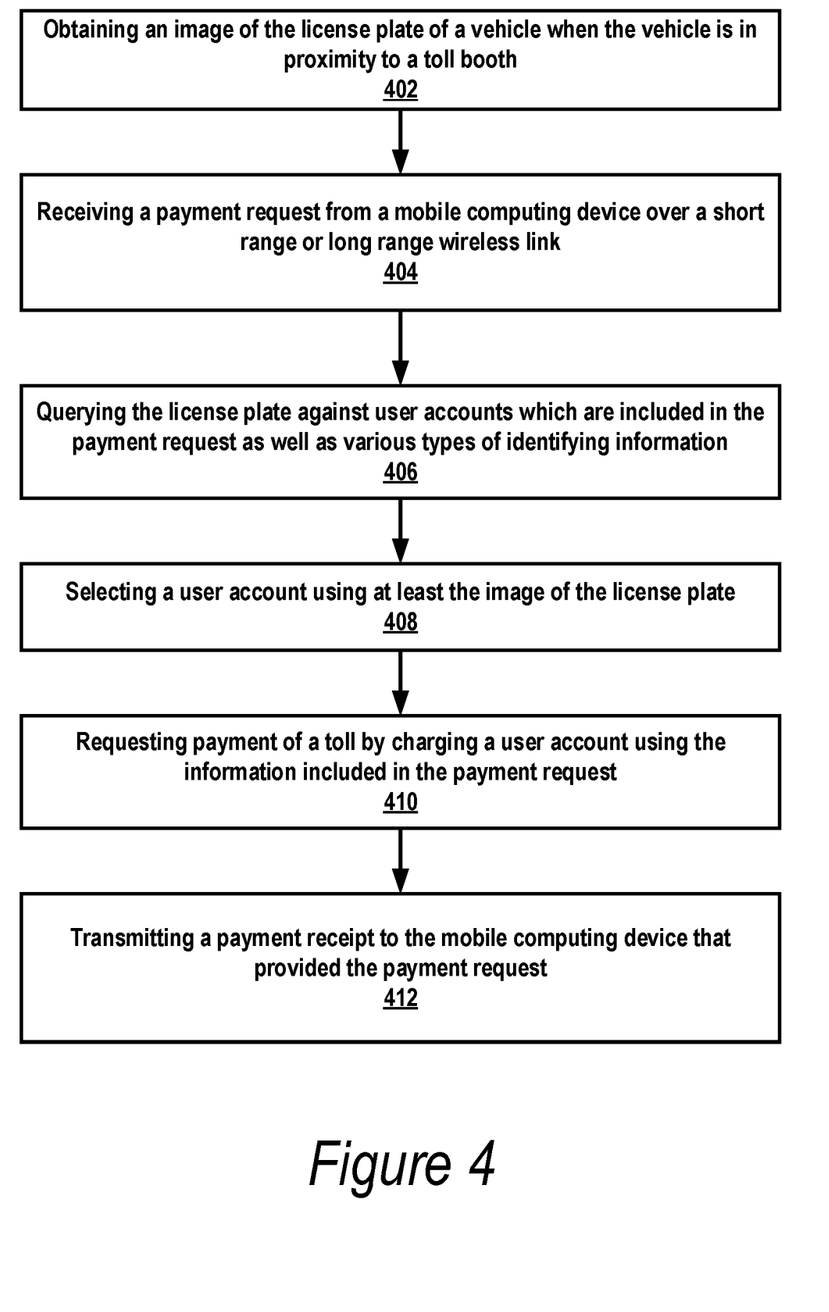
FIG. 4 is a flowchart of another example method of the present disclosure for processing a toll.

FIG. 4 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Figure 5:
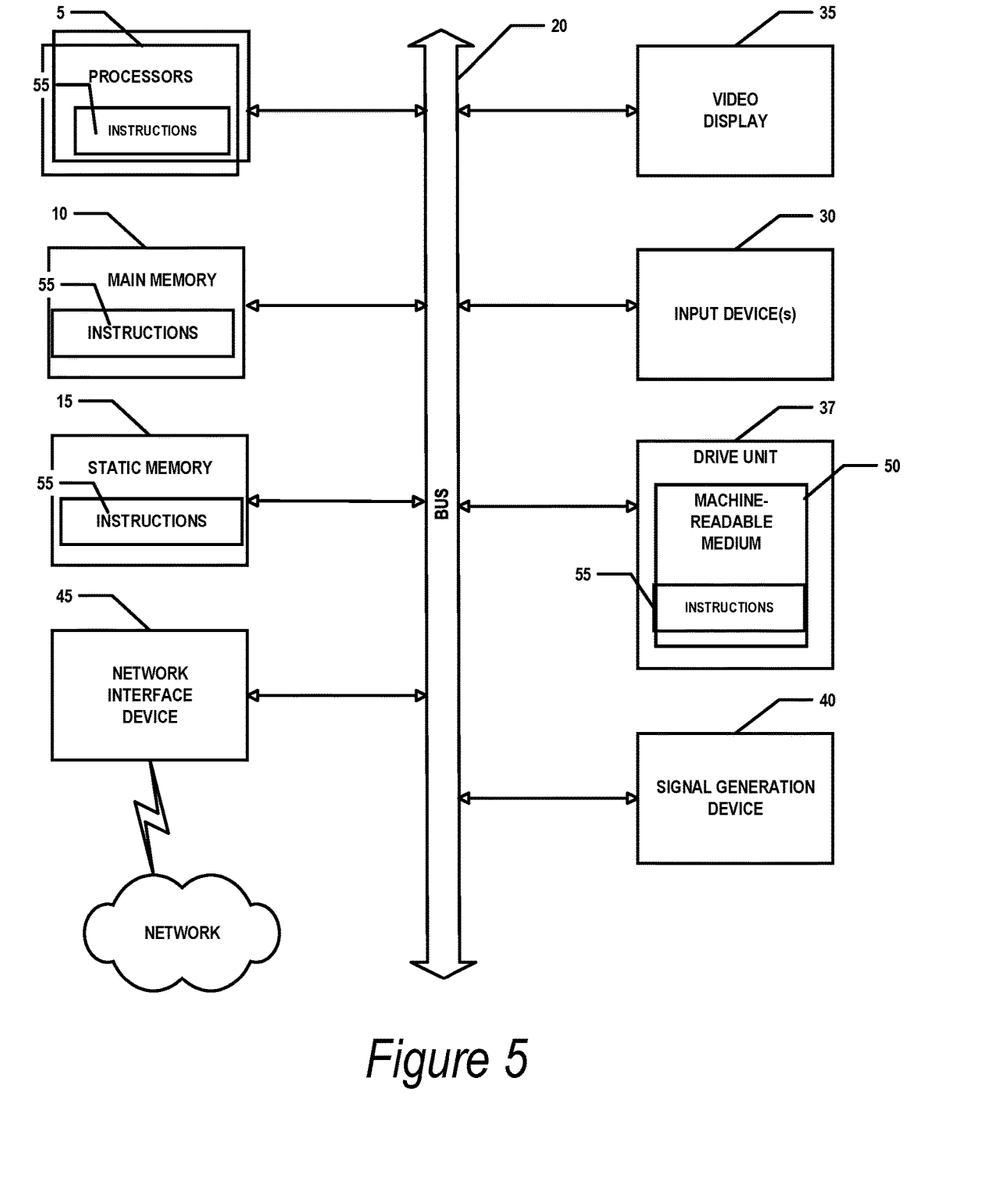
FIG. 5 is a flowchart of a system/computer system of the present disclosure.

As is shown, for example, in FIG. 5, the example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The disk drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically/communicatively connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed and desired to be secured by Letters Patent of the United States is:

1. A system, consisting of:
    a mobile computing device that:
        generates location based information of the mobile computing device;
        queries a database of toll booths defined by toll booth locations;
        determines that the location based information of the mobile computing device matches at least one of the toll booth locations; and transmits to a gateway server the location based information and identifying information that identifies a vehicle; and wherein the gateway server:
receives the location based information and the identifying information; and
requests payment of a toll by charging an account associated with the identifying information, the toll being based on the location based information.

\* \* \* \* \*